United States Patent
Fujii

[11] 3,784,851
[45] Jan. 8, 1974

[54] VENTILLATING ARRANGEMENT FOR DYNAMO-ELECTRIC MACHINES

[75] Inventor: Hisashi Fujii, Kawasaki, Japan

[73] Assignee: Fuji Denki Seizo Kabushiki Kaisha, Kawasaki-shi, Japan

[22] Filed: Feb. 24, 1972

[21] Appl. No.: 228,875

[30] Foreign Application Priority Data
Mar. 3, 1971 Japan.............................. 46/11187

[52] U.S. Cl. ............................................. 310/58
[51] Int. Cl. .......................................... H02k 9/00
[58] Field of Search...................... 310/58, 254, 52, 310/258, 55, 259, 59, 261, 60, 264, 64, 269, 310/65

[56] References Cited
UNITED STATES PATENTS

| | | | |
|---|---|---|---|
| 2,915,655 | 12/1959 | Baudry................................ | 310/55 |
| 2,917,644 | 12/1959 | Laffoon .............................. | 310/55 |
| 3,265,912 | 8/1966 | Baudry................................ | 310/55 |
| 3,439,202 | 4/1969 | Wanke................................ | 310/55 |
| 3,505,546 | 4/1970 | Victor................................. | 310/55 |
| 926,086 | 6/1909 | Behrend.............................. | 310/59 |

Primary Examiner—R. Skudy
Attorney—John C. Holman et al.

[57] ABSTRACT

A dynamo-electric machine of the natural ventillation type having no forced cooling nor any fan means to increase cooling of the machine utilizes fan-action caused by the rotation of the rotor whereby cooling air sucked into the rotor space provided by a rotor-spider is generally discharged, through radial ducts in the rotor into the machine air gap and finally axially through the machine air gap. Where very high rotational speeds are involved such as in high frequency generators, in order to reduce excessive windage losses caused by all the cooling air discharging axially through the machine air gap, the dynamo-electric machine stator is provided with independent duct systems comprising stator radial ducts in communication with the rotor radial ducts and stator axial ducts in communication with the stator radial ducts so as to substantially divert the cooling air discharge from the machine air gap into and through the stator, thereby reducing windage losses. The stator may be provided with an additional annularly surrounding cooling arrangement.

1 Claim, 4 Drawing Figures

VENTILLATING ARRANGEMENT FOR DYNAMO-ELECTRIC MACHINES

BACKGROUND OF THE INVENTION

The present invention relates to the structure of an electrical rotary machine in which the ventilating gaps in its stator iron core is improved, and more particularly to the structure of an electrical rotary machine in which ventilating passages divided into a plurality of independent air-flowing systems are provided in its stator iron core thereby to improve an cooling effect on the electrical rotary machine.

In an electrical rotary machine in which the gap between a rotor and a stator is small, the stator is often cooled directly by a cooling device provided on the peripheral portion of the stator core in order to improve the cooling effect. However, the ventilating cross-sectional area of the gap is limited, and therefore the cooling ventilation quantity applied thereto is also limited, and the output of the electrical rotary machine lies within a certain limited range.

In general, the ventilation resistance is proportional to the square of an air-flowing velocity. In order to obtain a large cooling quantity with a small ventilating cross-sectional area, it is one of the methods to increase the wind velocity, but is accompanied with increase of the ventilation resistance. Therefore, the maximum ventilation quantity is limited by the efficiency of a fan. Heretofore, the ventilating air flows from the inside of the rotor iron core through the ventilating gap of said rotor iron core, and is all put together at the axial ends of the electrical rotary machine thereby to be exhausted. As a result of which, the wind velocity in the gap between the rotor and stator at both ends of the electrical rotary machine is increased high, and the ventilation resistance is also increased high when the air flows through the gap, and therefore the ventilation quantity is limited at this gap. Especially in an electrical rotary apparatus such as a high-frequency generator is accompanied with the eddy currents which are magnetically caused on its iron core surface, and furthermore rotated at a higher speed for a higher frequency. Accordingly, it is necessary to cool down the heat caused by the air friction loss in the gap, and for this purpose it is essential to effectively cool down the electrical rotary machine by passing a cooling air through the gap. However, a special conideration must be paid to the electrical rotary apparatus provided with a cooling device on the peripheral portion of its stator portion.

SUMMARY OF THE INVENTION

It is accordingly a primary object of the present invention to eliminate the above-mentioned drawbacks involved in the conventional electrical rotary machine.

Another object of the present invention is to provide an electrical rotary machine, in which radial ventilating gaps and axial ventilating gaps are provided in the stator iron core of said rotary machine and ventilating passages divided into independent air-flowing systems, respectively, are formed in the ventilating gaps thereby to improve the cooling efficiency of said rotary machine.

A further object of the present invention is to provide an electrical rotary machine which comprises: a rotor having ventilating gaps adapted to introduce a cooling air; a stator which is provided with radial ventilating air; a stator which is provided with radial ventilating gaps, axial ventilating gaps, and ventilating passages divided into a plural of independent air-flowing systems; and a cooling device provided on the peripheral portion of the stator iron core, said rotary machine being made relatively small in size though it can be used on a heavy duty.

The foregoing objects and other objects can be achieved, according to the present invention, by the provision of an electrical rotary machine in which a plurality of radial ventilating gaps and a plurality of axial ventilating gaps are provided in a stator iron core, and furthermore duct pieces are provided in the radial ventilating gaps thereby to form ventilating passages divided into a plurality of independent air-flowing systems and thereby to improve a cooling effect on said rotary machine.

The nature, utility and principle of the present invention will be more clearly understood from the following detailed description and the appended claims when read in conjunction with the accompanying drawings, in which like parts are designated by like reference symbols.

DETAILED DESCRIPTION OF THE INVENTION

Figure 1:
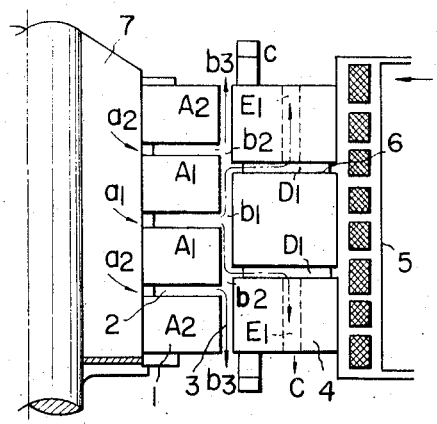
FIG. 1 is a cross-sectional view of the essential part of an embodiment of the electrical rotary machine, according to the present invention.

With reference now to FIG. 1, there is shown the cross-sectional view of the essential part of an electrical rotary machine, in which a cooling device 5 is provided on the peripheral portion of a stator iron core 4 which is in turn provided with a pair of radial ventilating gaps $D_1$, or ventilating gaps provided in a radial direction of the rotary apparatus, and a pair of axial ventilating gaps $E_1$, or ventilating gaps provided in an axial direction of the rotary machine. As these ventilating gaps $D_1$ and $E_1$ are thus provided in the rotor iron core, the air flowing to a ventilating gap 2 from an air-introducing passage 7 provided on the inside diameter side of a rotor is discharged flowing through ventilating passages ($a_2 \rightarrow b_2 \rightarrow$ gap $3 \rightarrow b_3$) and also through other ventilating passages ($a_1 \rightarrow b_1 \rightarrow$ gap $3 \rightarrow$ radial ventilating gap $D_1 \rightarrow$ axial ventilating gap $E_1 \rightarrow C$). As a result, it can be avoided that a ventilation quantity in the gap 3 at both ends of the iron core is increased uselessly, and the air is discharged through the ventilation bypassing passages provided in the stator core, and therefore the electeical rotary machine is effectively cooled down by ventilation. In addition, the radial ventilating gap $D_1$ is provided with a duct piece 6 which is adapted to maintain a gap between block iron cores. The embodiment of the present invention shown in FIG. 1 is of the case where the systematic number ($n$) of the ventilating passage is one (1) in the stator iron core.

The rotor comprises a plurality of sectionalized parts ($A_1, A_2.-$) of the rotor core which are supported by means of, for instance, a spider mounted on the sahft. Air admitted into the air-inflow passage 7 flows through the ducts radially provided between the sectionalized parts to provide a fan-action with the rotation of the rotor. It should be noted that this is different from the so-called forced-air cooling, wherein coolant air must be forced by a pumping means.

The provision of the independent duct systems in the stator in communication with the radial ducts of the rotor diverts part of the cooling air axially discharged at $D_3$ into ducts $D_1$ and $E_1$, thus significantly contributing to the decrease of windage losses of the machine. Windage losses are inherently of a considerable magnitude in high speed machines such as high frequency generators, wherein increased eddy current losses in the iron cores make the cooling problem more severe in prior art machines.

Figure 2:
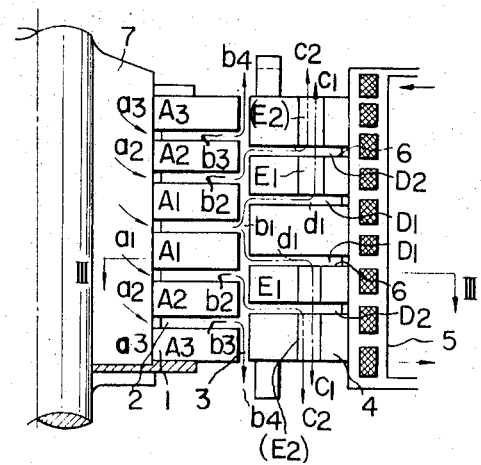
FIG. 2 is a cross-sectional view of the essential part of another embodiment of the present invention.

Referring now to FIG. 2, there is shown another embodiment of the present invention, in which the systematic number (a) of the ventilating passages in the stator core is two. The stator core is divided into five block cores. Duct pieces 6 are fixed in the radial ventilating gaps of the stator core 4. However, the duct pieces in said two adjacent radial ventilating gaps are arranged as intersected or crossed each other as shown in FIGS. 3 and 4, whereby axial ventilating gaps $E_1$ and $E_2$ are made to be in independent airflowing system, respectively.

As these ventilating gaps are thus arranged in the electrical rotary machine, the air flow introduced from the inside of the rotor is divided into three air-flowing systems - that is, a first air-flowing system is ($a_1 \rightarrow b_1 \rightarrow$ gap 3 $\rightarrow$ radial ventilating gap $D_1 \rightarrow$ axial ventilating gap $E_1 \rightarrow C_1$), a second one is ($a_2 \rightarrow b_2 \rightarrow$ gap 3 $\rightarrow$ radial ventilating gap $D_2 \rightarrow$ axial ventilating gap $E_2$ 7$C_2$), and a third one is ($a_3 \rightarrow b_3 \rightarrow$ gap 3 $\rightarrow b_4$). These air-flowing systems never intersect one another, and the airs having well-balanced pressures are discharged therethrough. Accordingly, even in the case where a gap between the rotor and the stator is made considerably small because of magnetical requirements, the cooling air flows satisfactorily through the electrical rotary machine thereby to effectively cool down it, and which enables a electrical rotary machine having a considerably large capacity to be manufactured.

The duct pieces may be in the form of waves or sawteeth and are arranged at an angle to a radial direction in the radial ventilation ducts, as a result of which the strain of the core, which is augmented by heat generated in the rotary machine, can be effectively minimized. It has been found as a result of experiments that duct pieces arranged as described above are superior as a constructional expedient in the prevention of the strain on the core compared to the duct pieces provided along the radial direction.

Figure 3:
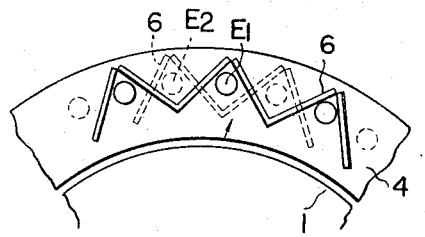
FIG. 3 is a diagram viewed along line III—III in FIG. 2.
Figure 4:
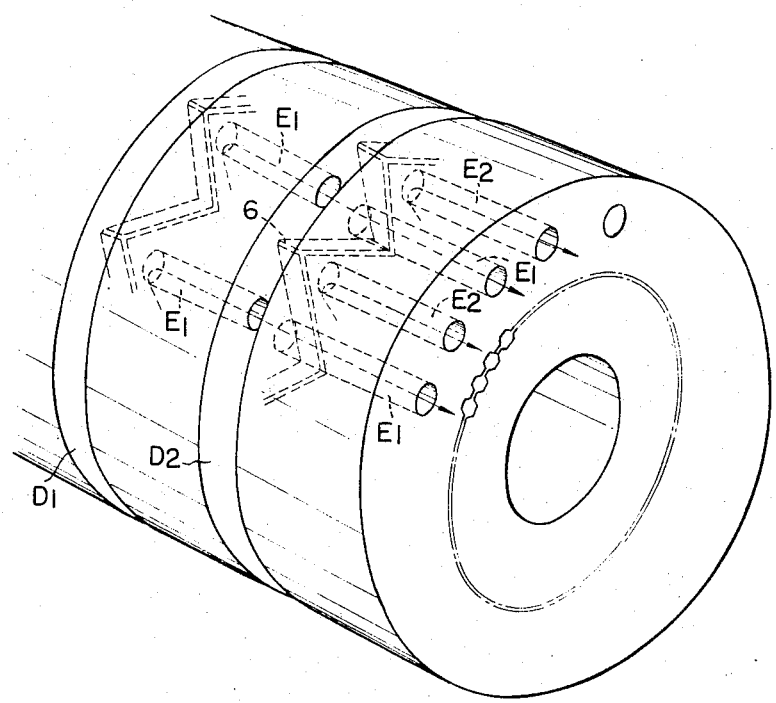
FIG. 4 is a perspective view of the stator shown in FIG. 2.

Furthermore, the duct pieces in the two adjacent radial ventilating ducts are arranged as intersecting or converging on each other as shown in FIG. 3. In other words, the tops or wave crests of one wave-shaped duct piece are staggered in position from those of the next wave-shaped duct piece as shown in FIGS. 3 and 4 so that all the ventilating passages are separated from one another. Thus, the cooling effect for the rotary machine can be obtained only by the fan action of the rotor (without the need for an additional fan for forced-air cooling). In addition, the present invention improves the cooling efficiency of the rotary machine in case where it is enclosed along the outer peripheral part of the stator.

As described above, according to the present invention, its objects can be economically achieved by provision of a stator core having simple construction, in which a plurality of ventilating gaps $D_1, D_2 - D_n$ are provided in the stator iron core in a radial direction thereof, a plurality of axial ventilating gaps $E_1, E_2 - E_n$ are provided in the stator iron core in an axial direction thereof, and duct pieces are arranged in the radial ventilating gaps with which the axial ventilating gaps communicate, so that the gaps $D_1$ and $E_1$, $D_2$ and $E_2$, - $D_n$ and E form ventilating passages divided into a plurality of independent air-flowing systems, respectively.

While a few embodiments of the present invention have been illustrated and described in detail, it is particularly understood that the present invention is not limited thereto or thereby.

I claim:

1. A dynamo-electric machine of the natural air-cooled type which utilizes fan-action caused by the rotation of the machine to draw cooling air into the rotor, wherein the cooling air is axially discharged through the machine air gap, the machine comprising:

a sectionalized rotor including radial duct means for providing a fan-action on rotation of the rotor, said radial duct means being disposed to draw cooling air from an air inflow ventilating passage formed in the rotor and directing cooling air into the machine air gap, the cooling air tending to be discharged axially of the machine air gap;

a stator with an enclosed outer periphery;

means for diverting part of the cooling air directed into the machine air gap from the rotor radial duct means into the stator for axial discharge from the stator comprising radial ducts formed in the stator to communicate with the machine air gap and a plurality of axial duct means in the stator to discharge cooling air from the stator radial ducts, whereby windage losses of the natural air cooled machine are reduced; and said stator radial ducts being formed by duct pieces, said duct pieces being arranged in a wave-form having a plurality of wave-crests each of said wave-crests portions of said duct pieces being alternately arranged at every consecutive axial duct means.

* * * * *